(12) United States Patent
Porte et al.

(10) Patent No.: US 9,845,707 B2
(45) Date of Patent: Dec. 19, 2017

(54) AIRCRAFT TURBOJET ENGINE NACELLE COMPRISE AN INCREASED-RIGIDITY AIR INTAKE

(71) Applicant: Airbus Operations (SAS), Toulouse (FR)

(72) Inventors: Alain Porte, Colomiers (FR); Matthieu Fargues, Montauban (FR)

(73) Assignee: Airbus Operations (SAS), Toulouse (FR)

( * ) Notice: Subject to any disclaimer, the term of this patent is extended or adjusted under 35 U.S.C. 154(b) by 652 days.

(21) Appl. No.: 14/575,392

(22) Filed: Dec. 18, 2014

(65) Prior Publication Data

US 2015/0191239 A1 Jul. 9, 2015

(30) Foreign Application Priority Data

Jan. 3, 2014 (FR) .................................. 14 50033

(51) Int. Cl.
| | |
|---|---|
| *F01D 25/24* | (2006.01) |
| *F01D 25/00* | (2006.01) |
| *B64D 33/02* | (2006.01) |
| *B64D 29/00* | (2006.01) |

(52) U.S. Cl.
CPC ............. *F01D 25/24* (2013.01); *B64D 29/00* (2013.01); *B64D 33/02* (2013.01); *F01D 25/005* (2013.01); *B64D 2033/0286* (2013.01)

(58) Field of Classification Search
CPC ....... F01D 25/24; F01D 25/005; B64D 29/00; B64D 33/02; B64D 2033/0286
See application file for complete search history.

(56) References Cited

U.S. PATENT DOCUMENTS

| | | | | |
|---|---|---|---|---|
| 5,239,822 A | * | 8/1993 | Buchacher | B64D 29/00 244/110 B |
| 6,027,078 A | | 2/2000 | Crouch et al. | |
| 7,506,838 B2 | * | 3/2009 | Porte | F01D 21/04 123/41.7 |

(Continued)

FOREIGN PATENT DOCUMENTS

| | | |
|---|---|---|
| EP | 0939028 | 9/1999 |
| EP | 1582701 | 10/2005 |
| FR | 2960856 | 12/2011 |

OTHER PUBLICATIONS

French Search Report, dated Sep. 9, 2014.

*Primary Examiner* — Dwayne J White
*Assistant Examiner* — Adam W Brown
(74) *Attorney, Agent, or Firm* — Greer, Burns & Crain, Ltd.

(57) ABSTRACT

An aircraft turbojet engine nacelle comprising an air intake assembly of substantially annular shape, the air intake assembly comprising an external wall and an internal wall which are connected to one another upstream by an air intake lip and downstream by an annular rear structure. The annular rear structure comprises, arranged concentrically, one or more monolithic panels forming a first annular zone and comprising one or more hollow casings forming at least a second annular zone, and at least one connecting ring which provides the connection with at least one of the external and internal walls. The annular rear structure thus has increased structural mechanical strength.

20 Claims, 3 Drawing Sheets

(56) References Cited

U.S. PATENT DOCUMENTS

| | | | | |
|---|---|---|---|---|
| 8,197,191 | B2 * | 6/2012 | Binks | B64D 29/08 |
| | | | | 415/119 |
| 8,438,857 | B2 * | 5/2013 | Shutrump | B64D 29/02 |
| | | | | 137/15.1 |
| 2005/0269443 | A1 | 12/2005 | Porte | |
| 2014/0147270 | A1 * | 5/2014 | Porte | B64D 33/02 |
| | | | | 415/214.1 |

* cited by examiner

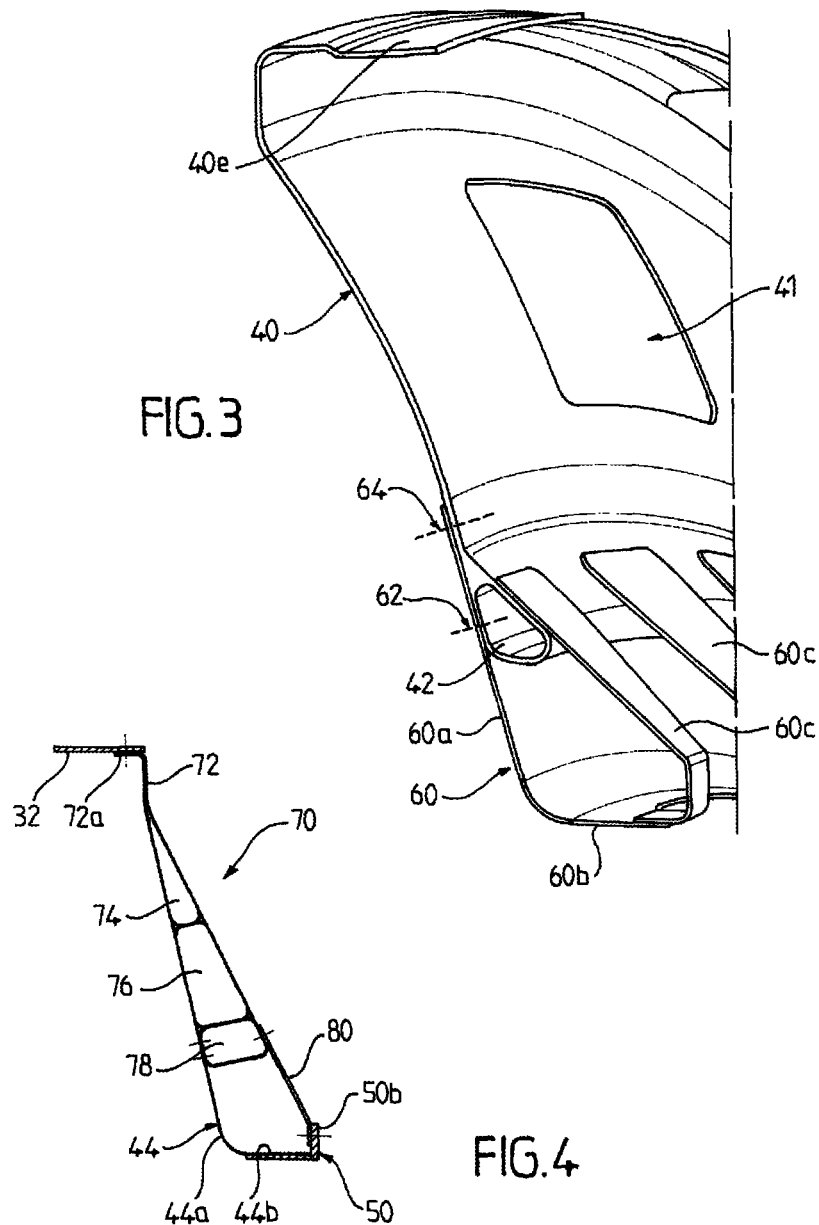

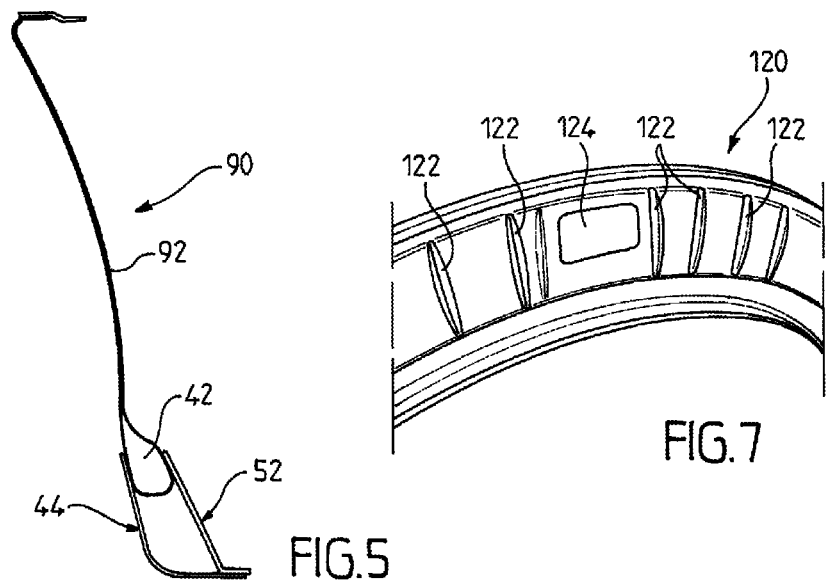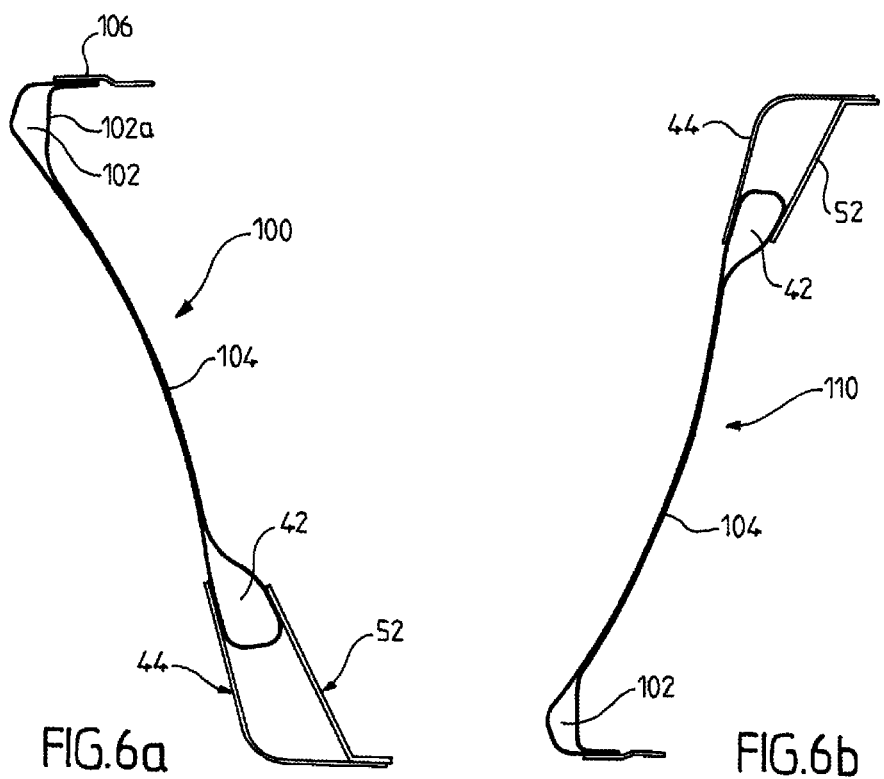

AIRCRAFT TURBOJET ENGINE NACELLE COMPRISE AN INCREASED-RIGIDITY AIR INTAKE

CROSS-REFERENCES TO RELATED APPLICATIONS

This application claims the benefit of the French patent application No. 1450033 filed on Jan. 3, 2014, the entire disclosures of which are incorporated herein by way of reference.

BACKGROUND OF THE INVENTION

The invention relates to an aircraft turbojet engine nacelle comprising an air intake assembly.

An aircraft turbojet engine nacelle generally comprises an air intake assembly of annular shape which comprises:

an external wall intended to be in contact with the flows of air external to the nacelle, an internal wall intended to guide the flow of air entering the nacelle toward the fan situated downstream, a leading edge placed upstream and which forms an air intake lip and connects the external and internal walls together, an annular rear structure which connects together the external and internal walls.

The rear structure alone reacts the bending force, rotation force or forces of any other type that are applied to the air intake assembly. Such forces are, for example, the weight of the air intake assembly and forces caused by the flows of air.

Certain aircraft are equipped with turbojet engines that have very high bypass ratios, which notably for this purpose have fans of very large diameter. For such turbojet engines, the weight of which is high, it is necessary to design a large-diameter rear structure that has both high resistance to the mechanical loadings generated as a result of the large size of the fan, and a weight that is relatively low.

SUMMARY OF THE INVENTION

A first aspect of the invention relates to an aircraft turbojet engine nacelle comprising an air intake assembly of substantially annular shape, the air intake assembly comprising an external wall and an internal wall which are connected to one another upstream by an air intake lip and downstream by an annular rear structure, wherein the annular rear structure comprises, arranged concentrically:

one or more monolithic panels forming a first annular zone and comprising one or more hollow casings forming at least a second annular zone, at least one connecting ring which provides the connection with at least one of the external and internal walls, said connecting ring extending from the hollow casing in the form of a third annular zone.

A monolithic panel here means a panel or a wall which is solid (homogeneous material), namely is not hollow, has no cellular or foamed structure, and therefore contains no heterogeneous elements within its structure.

The monolithic panels or panels and the hollow casing or casings give the annular rear structure of the air intake assembly increased structural mechanical strength without overly increasing the on-board mass. The monolithic panel may be a single panel and take the form of a first annular zone (360°). Alternatively, there may be several monolithic panels each adopting the form of a portion or sector of an annulus and which, assembled with one another in an airtight manner, form a first annular zone (360°). The same is true of the hollow casing which may on its own adopt the form of a second annular zone (complete annulus). Equally, there may be several hollow casings each having the form of a portion or sector of an annulus and which, assembled with one another in an airtight manner, form a second annular zone (complete annulus). It will be noted that the rear structure may equally comprise several hollow casings arranged concentrically with respect to one another. Each of said hollow casings alone constitutes a second annular zone or, alternatively, each of said hollow casings is formed of an assembly of several annulus portions or sectors of hollow casing.

Said at least one connecting ring gives the rear structure a certain degree of flexibility in its connection with one of the two, external and internal, walls.

This new rear structure configuration is thus particularly suited to turbojet engines with high bypass ratios.

According to other features considered in isolation or in combination with one another:

the monolithic panel or panels are curved;

the monolithic panel or panels have a convex side facing toward the downstream end of the nacelle or toward the upstream end of the nacelle;

the monolithic panel or panels are made of composite materials;

said at least one connecting ring is made of titanium;

the annular rear structure comprises one or more reinforcing elements reinforcing said at least one connecting ring;

the annular rear structure comprises, arranged successively and concentrically:

at least one monolithic panel which comprises a hollow casing, a connecting ring for connecting with the external or internal wall of the air intake assembly;

the annular rear structure comprises, arranged concentrically:

at least one monolithic panel which comprises a first hollow casing and a second hollow casing, said hollow casings being positioned respectively on the outer and inner peripheral edges of said at least one panel, a connecting ring for connecting with the external or internal wall of the air intake assembly;

the casing or casings form an integral part of the monolithic panel or panels.

An additional subject of the invention, in a second aspect thereof, is an aircraft which comprises at least one turbojet engine nacelle in accordance with the brief summary hereinabove.

BRIEF DESCRIPTION OF THE DRAWINGS

Other features and advantages will become apparent during the description which will follow, given solely by way of nonlimiting example and made with reference to the attached drawings in which:

FIG. 3 is a view of an alternative form of embodiment of the rear structure of FIG. 2;

FIG. 4 is a schematic view in longitudinal section of part of a rear structure according to a second embodiment of the invention;

FIG. 5 is a schematic view in longitudinal section of part of a rear structure according to a third embodiment of the invention;

FIG. 6a is a schematic view in longitudinal section of part of a rear structure according to a fourth embodiment of the invention;

FIG. 6b is a schematic view of a first alternative form of embodiment of the rear structure of FIG. 6a;

FIG. 7 is a schematic view of a second alternative form of embodiment of the rear structure of FIG. 6a.

DETAILED DESCRIPTION OF THE PREFERRED EMBODIMENTS

Figure 1:
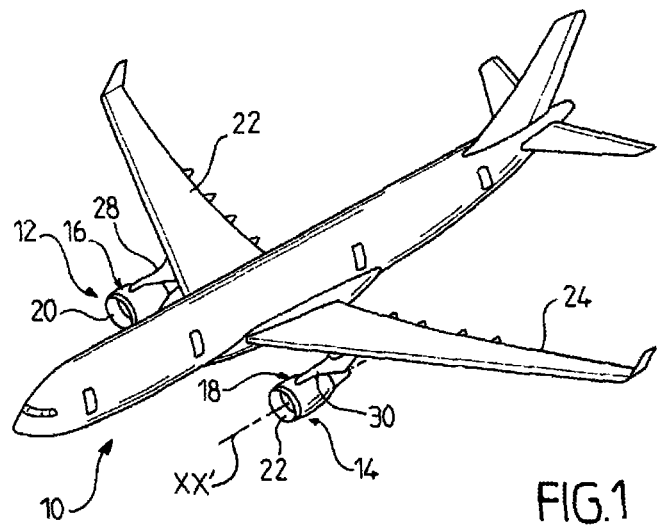
FIG. 1 is an overall schematic view of an aircraft according to one embodiment of the invention.

As indicated schematically in FIG. 1 and denoted by the general reference 10, an aircraft according to one embodiment of the invention comprises two propulsion units 12, 14.

Each propulsion unit 12, 14 comprises a respective turbojet engine nacelle 16, 18 and a turbojet engine inside the nacelle (not visible in the figure). Each nacelle 16, 18 comprises an air intake assembly 20, 22 according to one embodiment of the invention and which will be detailed with reference to FIG. 2 et seq.

The air intake assembly is the part of the nacelle which is situated at the most upstream end thereof in the direction of the stream of air entering the turbojet engine (the incoming stream of air is identified by the arrow F in FIGS. 1 and 2) and supplies the air necessary for the operation of the turbojet engine.

The air entering the nacelle first of all enters the air intake assembly, then encounters the fan (not depicted) and then enters the turbojet engine and the annular passage surrounding same.

The two propulsion units 12, 14 are respectively mounted fixedly under the wings 22, 24 of the aircraft via an attachment pylon 28, 30.

Figure 2:
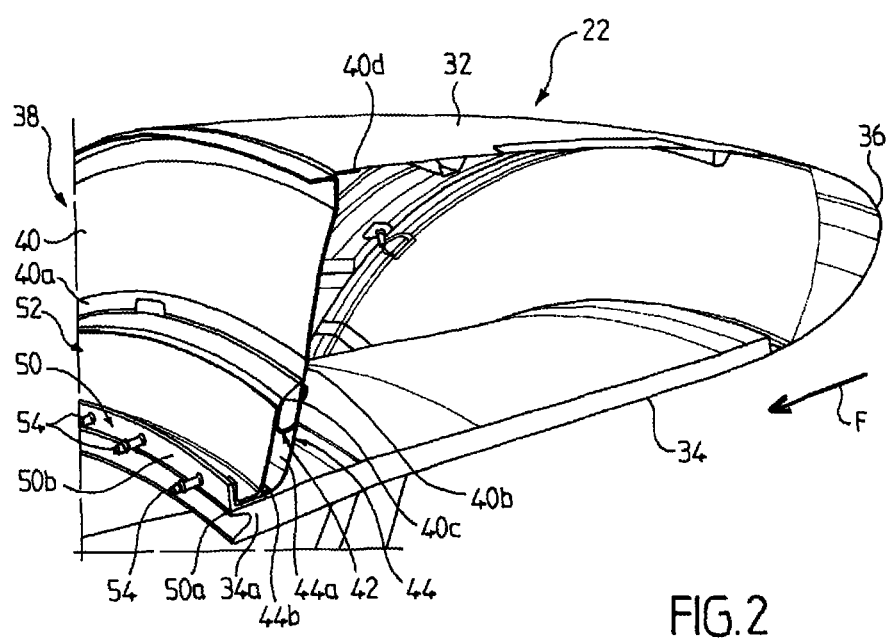
FIG. 2 is a partial schematic view in perspective from the rear on a longitudinal plane of section, of a rear structure of an air intake assembly according to a first embodiment of the invention.

FIG. 2 illustrates, in a partial view in perspective from the rear sectioned along a longitudinal plane, the configuration of each air intake assembly 20, 22 of FIG. 1.

For the remainder of the description, the air intake assembly of FIG. 2 is the assembly 22 (the air intake assembly 20 is identical).

The air intake assembly 22 has an annular overall shape and extends about a longitudinal axis XX' which is the longitudinal axis of the nacelle 18 (FIG. 1).

The air intake assembly 22 comprises in general:

an external wall 32 which is intended to be in contact with the flows of air external to the nacelle and encountered by the aircraft during flight;

an internal wall 34 which is intended to guide the flow of air (internal flow path) entering the air intake assembly toward the fan situated downstream;

an upstream wall 36 which forms a leading edge of the air intake assembly and connects together the external 32 and internal 24 walls at the respective upstream edges thereof; the upstream wall 36 forms what is commonly referred to as an air intake lip;

a rear structure 38 which connects together the external 32 and internal 34 walls at the respective downstream edges thereof.

As depicted in FIG. 2, the rear structure 38 generally comprises several concentric annular parts or zones which are arranged relative to one another in such a way as to form a structure that extends in substantially annular and continuous form between the two walls 32 and 34.

The annular rear structure 38 more particularly in this embodiment comprises three parts or zones which extend successively (concentrically) each over the entire circumference of the air intake assembly:

a monolithic panel 40 which extends, from the external wall 32 to which it is fixed, toward the internal wall 34, in the form of a first annular zone, a hollow casing 42 which forms an integral part of the panel 40 and which extends in the form of a second annular zone toward the internal wall 34, this second annular zone being positioned at the interior peripheral edge 40a of the panel, a connecting ring 44 which extends from the casing 42, in the form of a third annular zone which meets the internal wall 34 and is fixed thereto.

The monolithic panel is a panel made of a single piece which is homogeneous in its structure over the majority of its circumference.

As depicted in FIG. 2, the hollow casing 42 is made of a single piece with the monolithic panel. The piece is, for example, made of composite materials.

Such a component incorporates, before curing, a collection of fabrics or plies incorporating a resin. One peripheral edge of this assembly is laid up over a hot-melt core which has an annular shape suited to shaping the hollow casing 42 of FIG. 2. Upon curing, the meltable core evaporates and the folded-over shape of part of the component thus forms the panel 40 provided with the hollow casing 42 of FIG. 2.

As depicted in FIG. 2, the hollow casing is to an extent formed by the folding-over of a peripheral edge of the panel which doubles the panel. The casing 42 thus has the form of an annular bulge extending radially beyond the interior peripheral edge 40a of the panel, away from the latter.

Moreover, the outer peripheral edge 40d of the panel 40 is folded over parallel to the longitudinal axis of the nacelle to form a rim which is fixed, for example by screwing, to the internal face of the external wall 32. In FIG. 2, this rim is oriented toward the front of the nacelle.

The connecting ring 44 has, when viewed in longitudinal section, the overall shape of an L the vertical branch 44a of which extends radially between the horizontal branch 44b, fixed to the interior wall 34, and the hollow casing 42.

The vertical branch 44a is fixed to the hollow casing 42 (to the exterior face thereof which faces the inside of the air intake assembly 22) by through-fixings or blind fixings which have not been depicted.

The horizontal branch 44b of the ring rests indirectly on the rear portion 34a of the internal wall 44 which forms a protrusion of the nacelle in the downstream direction with respect to the external wall 32.

The horizontal branch 44b rests on an annular intermediate component 50 which has the overall shape of an L in longitudinal section. The component 50 comprises a horizontal branch 50a which is fixed, for example by screwing, to the rear portion 34a and to which is fixed, for example by screwing, the horizontal branch 44b of the connecting ring 44.

The component 50 also comprises a vertical branch 50b which extends radially facing the vertical branch 44a of the connecting ring 44.

In the embodiment of FIG. 2, the connecting ring 44 is attached to the internal wall 34 of the air intake assembly and may therefore be made from a different material from that of the wall. Thus, the connecting ring 44 can be made of a "flexible" metal such as titanium with a thickness of, for example, between 2 mm and 1 cm. The ring thus produced has the ability to deform elastically under the effect of an external mechanical force and to revert to its original shape after the applied force disappears.

The configuration set out hereinabove for the rear structure 38 makes it possible to create an annular structure that is homogeneous over the entire circumference thereof, notably by virtue of the monolithic panel 40 which extends continuously over 360°.

Openings may be made in the panel 40 (see for example FIG. 3, opening 41) for the passage of pipes (for example for de-icing the air intake lip), electric cables or to form inspection hatches. However, the creation of these openings does not jeopardize the homogeneity of the annular structure of the panel 40 by creating zones that might weaken the resistance to mechanical stress.

The combined arrangement of the monolithic panel and of the hollow casing (rigid structure) which extend for example both of them over 360° (without discontinuity) and over the majority (for example of the order of 70 to 90%) of the radial dimension (or height) of the annular rear structure offers the latter a mechanical strength (notably a rigidity) that is improved for a relatively low weight. The presence of the hollow casing in fact affords high mechanical strength for low weight. This allows the rear structure to be better suited to engines that have a large-diameter (for example of 3 to 4 m) fan, for which the height or length-to-height ratio of the rear structure is likely to generate a lack of stability.

This lack of stability is generally compensated for, conventionally, by an increase in the thicknesses of the structural walls in order to withstand the high pressures applied to the rear structure, resulting in an increase in weight. This is not necessary with the rear structure according to the embodiment of the invention.

The increased mechanical strength of the annular rear structure 38 allows it, for more voluminous and heavier engines, to better withstand:
the mechanical stresses originating from the engine;
the pressures that may be generated along the longitudinal axis of the nacelle if a hydraulic pipe bursts and generates a buckling force on the rear structure;
the forces due mainly to the potential breakage of fan blades, the fan being situated near the interface between the air intake assembly and the engine;
external aerodynamic pressures (external air) and internal aerodynamic pressures (airflow path in the region of the fan).

The connecting ring 44 acts as a zone of connection with the interior wall 34 and also gives the improved-rigidity annular rear structure flexibility/suppleness by absorbing knocks/impacts very effectively.

An (optional) additional ring 52 that complements the connecting ring 44 is, for example, provided by way of an element for reinforcing the latter ring.

The ring 52 extends in annular form between the hollow casing 42 on the exterior face (the face facing toward the downstream end of the nacelle) of which it is fixed, for example by screwing, and the intermediate component 50.

At its opposite part to the part fixed to the casing 42, the ring 52 comprises a horizontal return followed by one or more vertical returns fixed to the intermediate component 50 by fixings 54 such as rivets.

According to a first alternative form that has not been depicted, the monolithic panel and the hollow casing are each formed of two or three components each of which extends in the form of a portion of an annulus and which are assembled in an airtight manner in order to create an annular structure extending over 360°.

According to a second alternative form of embodiment which has not been depicted, the connecting ring forms an integral part of the internal wall 34 and is therefore made of the same material as said wall (for example of composite materials).

According to a third alternative form which has not been depicted, the monolithic panel is configured at its external peripheral edge so that it can be connected to the external wall 32 and act as a support for the fan cowl.

FIG. 3 illustrates an alternative form of embodiment in which the additional ring 52 has been omitted.

The connecting ring 44 has been modified and is referenced 60.

The ring 60 comprises a vertical first part 60a, identical to the part 44a, fixed to the hollow casing 42 and to the panel 40 by respective fixings 62, 64.

The ring 62 comprises a horizontal second part 60b which, like the part 44b, extends away from the first part 44a.

The second part 60b is locally extended by returns 60c, spaced apart around the circumference and folded over against the external face of the hollow casing 42 to which they are fixed. These returns 60c have the appearance of reinforcing tabs and perform the same function as the additional ring 52.

FIG. 3 depicts an opening 41 made in the panel 40 (one of a number of openings made in the circumference thereof) and which allows various hydraulic and electrical elements such as pipes and electrical cables etc. to pass.

The folded-over outer edge 40e of the panel 40 is oriented here toward the rear of the nacelle, unlike the edge 40d in FIG. 2.

A second embodiment of a rear structure of an air intake assembly is depicted in FIG. 4 in partial longitudinal section.

The rear structure 70 differs from the rear structure 38 of FIG. 2 chiefly through the presence of several hollow casings rather than a single hollow casing 42.

The rear structure 70 thus comprises, arranged in succession (concentrically) from the external wall 32 (external peripheral edge) and as far as the internal wall 34 (internal peripheral edge not depicted):
a monolithic panel 72 which extends in a first annular zone the radial extend of which is small by comparison with the panel 40 of FIG. 2; the panel 72 has a horizontal rim 72a used to attach said panel to the external wall 32;
three hollow casings 74, 76, 78 which are incorporated into the panel 72 and successively extend in different concentric annular zones adjacent to one another;
the connecting ring 44 which is fixed to the intermediate component 50 via the horizontal branch 44b thereof and to the external face of the casing 78 which faces toward the inside of the air intake assembly (directed upstream).

The rear structure 70 thus configured with three casings offers improved rigidity by comparison with the rear structure 38 of FIG. 2 for a relatively small increase in weight. The increasing thickness of the casings from the casing 74 to the casing 78 allows the forces between two points arranged respectively on the internal and external peripheries of the structure formed of the casings to be reacted homogeneously. In addition, several separate casings limit, or even avoid, vibrations.

It will be noted that the assembly of the panel 72 and of the three casings 74, 76, 78 is, for example, formed by laying up several plies (incorporating a resin) respectively around (hot-meltable) annular cores arranged concentrically and adjacent to one another. After curing, the cores have evaporated and the hollow annular casings 74, 76, 78 are configured as illustrated in FIG. 4.

Optionally, the structure 70 comprises an additional ring 80 which rests against and is fixed to both that external face of the casing 78 that faces toward the outside of the air intake assembly (faces downstream) and the inside of the vertical rim 50*b* formed by the intermediate component 50.

This ring performs a function of mechanically strengthening the connecting ring 44.

According to an alternative form of embodiment which has not been depicted, the number of hollow casings differs according to the geometry of the nacelle. For example, the space occupied by the three casings 74, 76, 78 is instead occupied by a single casing of a thickness that increases from the external periphery to the internal periphery.

A third embodiment of a rear structure 90 of an air intake assembly is depicted in FIG. 5 in partial longitudinal section.

The rear structure 90 differs from the rear structure 38 of the FIG. 2 chiefly in the curved shape of the monolithic panel.

The monolithic panel 92 more particularly has a convex face facing toward the downstream end of the nacelle.

By curving the monolithic structure 92 in the direction of the turbojet engine, namely in the direction of that region of the nacelle from which an increase in pressure is likely to originate if a pipe bursts, the mechanical strength (resistance to buckling) thereof in the face of such an overpressure is increased.

The curvature (convexness) conferred upon the monolithic panel 92 allows the size of the hollow casing 42 to be optimized while increasing the resistance of the structure to buckling.

When the connecting ring is made of a flexible metal, the annular rear structure affords results which are optimized in terms of strength (rigidity) and flexibility which are perfectly suited to engines with a high bypass ratio.

A fourth embodiment of a rear structure 100 of an air intake assembly is depicted in FIG. 6*a* in partial longitudinal section.

The rear structure 100 differs from that of FIG. 5 through the presence of a second hollow casing 102 positioned opposed to the first hollow casing 42 with respect to the monolithic panel 104.

The two hollow casings 42, 102, thus arranged at the two, outer and inner, peripheral edges of the curved panel 104, are therefore separated from one another by the panel.

This arrangement makes the assembly easier to manufacture as a single piece formed of the panel and of the casings 42, 102.

As with the manufacture of the preceding embodiments, the hollow casings incorporated into the panel are obtained by laying up one or more plies around two (hot-meltable) cores separated from one another.

When this component made of composite materials is being cured or formed, the pressure is applied to the entirety of the external surface of the casings, making it possible to make the manufacture of the casings uniform. By way of example, the desired shape and desired thickness of the thermosetting composites are obtained by curing in an autoclave at a temperature of the order of 180° C. and at a pressure of 4 to 7 bar. If the component is being formed, the hot forming of the thermoplastics materials takes place for example at temperatures of the order of 350 to 450° C., in a press.

The monolithic component formed of the panel 104 and of the casings 42, 102 comprises, arranged adjacent to the external casing 102, a longitudinally extending rim 106 (surface extended with respect to the rim 40*d* of FIG. 2) which has a fixing function.

It will be noted that the portion of wall 102*a* partially delimiting the casing 102 on the downstream side of the nacelle adopts a substantially rectilinear shape which diverges from the extension of the curvature of the curved panel 104. This configuration of the wall portion 102*a* gives the structure thus created stiffness.

The presence of one or more casings at the external peripheral edge (the upper edge in the figures) of the rear structure may be beneficial for mechanically strengthening the structure the height of which is increased because of an engine with a high bypass ratio (without increasing the on-board mass to a penalizing extent).

The presence of this or these casing or casings may also make connection to the external wall or structure of the air intake assembly easier.

The advantages of the other embodiments and alternative forms also apply to the embodiment of FIG. 6*a*.

FIG. 6*b* illustrates a first alternative form of embodiment of the rear structure of FIG. 6*a*.

The arrangement of the connecting ring 44 and of its additional ring 52 of FIG. 6*a* (or of one or several other reinforcing elements) is reversed on the rear structure 110 of FIG. 6*b*. The same is true of the layout of the hollow casings 42 and 102.

This alternative form offers the same advantages as those of the embodiment of FIG. 6*a*. This alternative form may also prove more appropriate depending on the geometry of the nacelle and the size of the engine.

FIG. 7 illustrates a second alternative form of embodiment of the rear structure of FIG. 6*a*. In the rear structure 120, the curved central panel 104 is provided with stiffening elements 122 distributed over the entire circumference on either side of through-openings 124 provided, for example, for the passage of pipes, cables, etc.

The stiffening elements 122 are arranged radially on the external face (the face facing toward the downstream end of the nacelle) of the panel 104 in a manner spaced apart from one another over the entire height of the curved part.

The stiffening elements are formed at the same time as the panel and form part thereof.

These elements give the monolithic panel additional rigidity in order further to improve its resistance to buckling.

According to an alternative form that has not been depicted, the stiffening elements 122 are provided on a non-curved monolithic panel such as the panel 40 in FIG. 2.

The annular rear structure of the invention offers, in addition to improved mechanical strength, greater "multi-plane" stability without resorting to cellular or sandwich-type structures, i.e. to structures comprising several layers made of different materials. What is meant by "multi-plane" stability of the structure is a stability that allows said structure better to withstand the pressures applied to it; the pressure of the external air, the pressure in the event of a fan blade shattering, and the pressure in the event of a pipe bursting.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft turbojet engine nacelle comprising:
an air intake assembly of substantially annular shape and comprising an external wall and an internal wall which are connected to one another upstream by an air intake lip and downstream by an annular rear structure,
the annular rear structure comprises, arranged concentrically:
one or more monolithic panels forming a first annular zone and comprising one or more hollow casings forming at least a second annular zone,
at least one connecting ring which provides a connection with at least one of the external and internal walls, said connecting ring extending from the hollow casing, in the form of a third annular zone.

2. The aircraft turbojet engine nacelle as claimed in claim 1, wherein the monolithic panel or panels are curved.

3. The aircraft turbojet engine nacelle as claimed in claim 2, wherein the monolithic panel or panels have a convex side facing toward the downstream end of the nacelle.

4. The aircraft turbojet engine nacelle as claimed in claim 1, wherein the monolithic panel or panels are made of composite materials.

5. The aircraft turbojet engine nacelle as claimed in claim 1, wherein said at least one connecting ring is made of titanium.

6. The aircraft turbojet engine nacelle as claimed in claim 1, wherein the annular rear structure comprises one or more reinforcing elements reinforcing said at least one connecting ring.

7. The aircraft turbojet engine nacelle as claimed in claim 1, wherein the at least one monolithic panel and the connecting ring are arranged successively.

8. The aircraft turbojet engine nacelle as claimed in claim 1, wherein the
at least one monolithic panel comprises a first hollow casing and a second hollow casing, said hollow casings being positioned respectively on the outer and inner peripheral edges of said at least one panel.

9. The aircraft turbojet engine nacelle as claimed in claim 1, wherein the one or more hollow casings form an integral part of the monolithic panel or panels.

10. The aircraft turbojet engine nacelle as claimed in claim 1, wherein the one or more hollow casings extend 360 degrees around the annular rear structure.

11. The aircraft turbojet engine nacelle as claimed in claim 10, wherein the monolithic panel or panels are made of composite materials.

12. The aircraft turbojet engine nacelle as claimed in claim 10, wherein said at least one connecting ring is made of titanium.

13. The aircraft turbojet engine nacelle as claimed in claim 10, wherein the annular rear structure comprises one or more reinforcing elements reinforcing said at least one connecting ring.

14. The aircraft turbojet engine nacelle as claimed in claim 10, wherein the at least one monolithic panel comprises a first hollow casing and a second hollow casing, said hollow casings being positioned respectively on the outer and inner peripheral edges of said at least one panel.

15. The aircraft turbojet engine nacelle as claimed in claim 10, wherein the one or more hollow casings form an integral part of the monolithic panel or panels.

16. The aircraft turbojet engine nacelle as claimed in claim 10, wherein the one or more hollow casings extend 360 degrees around the annular rear structure.

17. An aircraft which comprises at least one aircraft turbojet engine nacelle comprising:
an air intake assembly of substantially annular shape and comprising an external wall and an internal wall which are connected to one another upstream by an air intake lip and downstream by an annular rear structure,
the annular rear structure comprises, arranged concentrically:
one or more monolithic panels forming a first annular zone and comprising one or more hollow casings forming at least a second annular zone,
at least one connecting ring which provides a connection with at least one of the external and internal walls, said connecting ring extending from the hollow casing, in the form of a third annular zone,
wherein the monolithic panel or panels are curved and have a convex side facing toward the downstream end of the nacelle.

18. An aircraft turbojet engine nacelle comprising:
an air intake assembly of substantially annular shape and comprising an external wall connected to an internal wall by an air intake lip and by an annular rear structure,
the annular rear structure comprising:
one or more monolithic panels forming a first annular zone and comprising one or more hollow casings forming at least a second annular zone,
at least one connecting ring which provides a connection with at least one of the external and internal walls, said connecting ring extending from the hollow casing, in the form of a third annular zone, and
one or more reinforcing elements reinforcing said at least one connecting ring.

19. The aircraft turbojet engine nacelle as claimed in claim 10, wherein the monolithic panel or panels are curved.

20. The aircraft turbojet engine nacelle as claimed in claim 19, wherein the monolithic panel or panels have a convex side facing toward the downstream end of the nacelle.

* * * * *